(12) United States Patent
Kippschull (10) Patent No.: US 11,186,249 B2
(45) Date of Patent: Nov. 30, 2021

(54) PASSENGER AIRBAG (71) Applicant: Key Safety Systems, Inc., Sterling Heights, MI (US)

(72) Inventor: Bernd Kippschull, Mörfelden-Walldorf (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 177 days.

(21) Appl. No.: 16/467,753

(22) PCT Filed: Dec. 8, 2017

(86) PCT No.: PCT/US2017/065343
§ 371 (c)(1),
(2) Date: Jun. 7, 2019

(87) PCT Pub. No.: WO2018/125542
PCT Pub. Date: Jul. 5, 2018

(65) Prior Publication Data
US 2019/0344745 A1 Nov. 14, 2019

Related U.S. Application Data

(60) Provisional application No. 62/431,924, filed on Dec. 9, 2016.

(51) Int. Cl.
*B60R 21/2338* (2011.01)
*B60R 21/205* (2011.01)
*B60R 21/235* (2006.01)

(52) U.S. Cl.
CPC ........ *B60R 21/2338* (2013.01); *B60R 21/235* (2013.01); *B60R 21/205* (2013.01);
(Continued)

(58) Field of Classification Search
CPC .............. B60R 21/2338; B60R 21/205; B60R 2021/23538
See application file for complete search history.

(56) References Cited

U.S. PATENT DOCUMENTS 7,152,880 B1 * 12/2006 Pang ..................... B60R 21/233
280/743.2
7,712,769 B2 * 5/2010 Hasebe ................. B60R 21/231
280/729
(Continued)

FOREIGN PATENT DOCUMENTS

DE 4334606 4/1994
DE 102015012180 A1 * 3/2016 ........... B60R 21/239
(Continued)

*Primary Examiner* — Karen Beck
(74) *Attorney, Agent, or Firm* — Meunier Carlin & Curfman LLC (57) ABSTRACT

An airbag for a front passenger seat, comprising: an inlet port for inflation gas; a main body, formed of at least one panel of fabric, and comprising a retainer (3) adapted for mounting the airbag to a vehicle, and a passenger contact region; and at least one tether (4) located inside the main body and connecting the retainer (3) to the passenger contact region so as to restrain inflation of at least a portion of the passenger contact region, wherein the tether (4) is attached to the fabric panel along a generally vertical line by stitches (7) which pass through stitch holes which are located inside the main body.

11 Claims, 12 Drawing Sheets

(52) U.S. Cl.
CPC ............... *B60R 2021/23509* (2013.01); *B60R 2021/23538* (2013.01)

(56) References Cited

U.S. PATENT DOCUMENTS

| | | | | |
|---|---|---|---|---|
| 8,371,612 | B2* | 2/2013 | Williams | B60R 21/2338 280/743.2 |
| 8,757,661 | B2 | 6/2014 | Abramoski et al. | |
| 8,899,618 | B2* | 12/2014 | Eckert | B60R 21/231 280/731 |
| 10,427,638 | B2* | 10/2019 | Choi | B60R 21/233 |
| 10,661,746 | B2* | 5/2020 | Yamada | B60R 21/205 |
| 2003/0168842 | A1* | 9/2003 | Igawa | B60R 21/233 280/743.2 |
| 2003/0230883 | A1* | 12/2003 | Heym | B60R 21/2338 280/743.1 |
| 2004/0119271 | A1* | 6/2004 | Webber | B60R 21/233 280/731 |
| 2006/0186656 | A1* | 8/2006 | Kumagai | B60R 21/231 280/743.2 |
| 2007/0252365 | A1* | 11/2007 | Urushibata | B60R 21/233 280/729 |
| 2009/0302587 | A1* | 12/2009 | Thomas | B60R 21/2338 280/743.2 |
| 2012/0205900 | A1* | 8/2012 | Mallinger | B60R 21/231 280/743.2 |
| 2015/0001836 | A1 | 1/2015 | Yamada | |
| 2016/0082916 | A1* | 3/2016 | Miura | B60R 21/2338 280/728.3 |
| 2016/0207490 | A1* | 7/2016 | Yamada | B60R 21/235 |
| 2016/0280176 | A1* | 9/2016 | Yamada | B60R 21/2338 |
| 2017/0136981 | A1* | 5/2017 | Fukawatase | B60R 21/2338 |
| 2019/0291681 | A1* | 9/2019 | Nakajima | B60R 21/216 |
| 2019/0351862 | A1* | 11/2019 | Aranzulla | B60R 21/231 |
| 2020/0139918 | A1* | 5/2020 | Koo | B60R 21/23138 |

FOREIGN PATENT DOCUMENTS

| | | | | |
|---|---|---|---|---|
| JP | 2008254500 | A | * 10/2008 | ......... B60R 21/2338 |
| JP | 2018001939 | A | * 1/2018 | ............ B60R 21/205 |

* cited by examiner

PASSENGER AIRBAG

This application is a U.S. national stage of PCT/US2017/065343 filed on Dec. 8, 2017, which claims priority to and the benefit of U.S. provisional application 62/431,924 filed on Dec. 9, 2016, the contents of which are incorporated herein by reference in their entireties.

BACKGROUND AND SUMMARY OF THE INVENTION

The present invention relates to a vehicle safety restraint and particularly to an airbag for a front passenger seat.

Airbags employed as safety restraints in vehicles inflate to cushion the forward movement of a person in the event of a sudden deceleration of the vehicle in a crash situation. It is known to employ them in a vehicle steering wheel to protect a vehicle driver, in a vehicle instrument panel to protect a front seat passenger, and in side panels to protect drivers and passengers in the event of side impact or oblique collisions when momentum propels a person toward vehicle side panels or pillars.

Airbags for front passenger seats aim to restrain a passenger's shoulders as well as their head, and to contact the shoulders to reduce the momentum of the moving passenger before contacting the head, so as to minimise injury to the head and neck which are more vulnerable parts of the body. For this purpose, known passenger airbags are made of panels of fabric stitched together in a shape such that on inflation, lateral or side portions project further toward the passenger, and contact the passenger's shoulders first, compared to a central portion which aims to protect the head of the passenger.

However, such an airbag must protect a wide variety of sizes and shapes of passenger and it is difficult to design a generic shape that does this. A passenger airbag suitable for passengers of a range of different heights is described in U.S. Pat. No. 8,757,661 where the central portion is formed as a vertical slit. The shape of this slit is retained against the inflation pressure of the airbag by internal tethers stitched into opposing seams of panels of the airbag fabric.

However, the tethers put additional strain on the seams when the airbag inflates and this tends to increase the size of the seam stitch holes, so there is a tendency for inflation gas to flow out through the stitch holes, which reduces the effectiveness of the airbag, and is an unpleasant and possibly dangerous experience for the passenger, particularly where the flow is in the region of the passenger's face. Also, the extra stitch holes created by sewing the tether tends to weaken the seams so that they are more likely to tear or otherwise fail.

Thus, in known designs tethers often need reinforcement to avoid failure, which adds to the expense of manufacture. In addition, we have found that the internal tethers in known designs do not hold the airbag shape as satisfactorily as would be desired.

Another problem encountered with known passenger airbags is that, at the moment of impact, a passenger may not be in the ideal position for the airbag to work effectively, for example if the passenger is sleeping, reaching for items in door trays, or talking to passengers in the rear of the vehicle. In such an out-of-position (OOP) situation the passenger's head may contact the side shoulder portions of an inflating airbag, and this can cause injury because the head is then pushed back or moved to the side during deployment of an airbag.

According to one aspect of the present invention there is provided an airbag for a front passenger seat, comprising: an inlet port for inflation gas; a main body, formed of at least one panel of fabric, and comprising a retainer adapted for mounting the airbag to a vehicle, and a passenger contact region; and at least one tether located inside the main body and connecting the retainer to the passenger contact region so as to restrain inflation of at least a portion of the passenger contact region, wherein the tether is attached to the fabric panel along a generally vertical line by stitches which pass through stitch holes which are located inside the main body.

Preferably the tether is attached to the passenger contact region by stitching to a part of the panel fabric which part is inside the main body, and may comprise an internal pleat formed by folding and stitching the panel fabric.

Even more preferably the at least one tether comprises a longitudinally folded length of fabric having one end divided longitudinally, and one of the divided ends is stitched in contact with one fold of the pleat and the other of the divided ends is stitched in contact with the opposite fold of the pleat.

Alternatively, the part comprises an internal portion of a seam in the fabric panel which portion is inside the main body. Similarly, the at least one tether comprises a longitudinally folded length of fabric having one end divided longitudinally, and wherein one of the divided ends is stitched in contact with one inside piece of fabric of the seam and the other of the divided ends is stitched in contact with the other piece of fabric of the seam.

Embodiments of the first aspect of the invention can provide an airbag in which the possibility of gas flow through stitch holes such as between fabric panels is reduced. This is because the tether stitches are on the inside of the airbag and the strain on the tethers on inflation of the airbag tends to pull the layers together rather than apart.

Pleats and tethers can be used to create a variety of airbag shapes and sizes from the same basic pattern of fabric panels, thus providing the flexibility to make airbags to suit many different vehicle models without changing the main parts of a production line, and thus without increasing manufacturing costs.

According to a second aspect of the present invention there is provided an airbag for a front passenger seat, comprising: an inlet port for inflation gas; a main body, formed of at least one panel of fabric, and comprising a retainer adapted for mounting the airbag to a vehicle, and a passenger contact region; the airbag further comprising: at least one tether located inside the main body and connecting the retainer to two horizontally spaced and vertically oriented sections of the passenger contact region, so as to restrain inflation along two vertical lines of at least a portion of the passenger contact region.

Embodiments of the second aspect of the invention can provide an airbag in which a passenger's head is advantageously steered into the correct position for efficient operation of the airbag, even when the passenger is out of position.

According to a third aspect of the present invention there is provided an airbag for a front passenger seat, comprising: an inlet port for inflation gas; a main body, formed of at least one panel of fabric, and comprising a retainer adapted for mounting the airbag to a vehicle, and a passenger contact region; and at least one tether located inside the main body and connecting the retainer to the passenger contact region so as to restrain inflation of at least a portion of the passenger contact region, wherein the tether comprises an elongated piece of fabric which is longitudinally folded and wherein one end of the tether is divided in a longitudinal direction, and wherein one divided part of the end is adjacent and stitched to one side of a seam of the panel fabric and the other divided part of the end is adjacent and stitched to the opposite side of the seam.

Embodiments of the third aspect of the invention can provide an airbag in which advantageously the passenger airbag provides effective protection against passenger momentum both forwards and sideways.

Preferably, in each aspect of the invention, each of the divided ends of the tether is attached to the seam of the fabric panel along a generally vertical line by stitches which pass through stitch holes which are located inside the main body.

The tether may be attached in a generally horizontal plane to the retainer. The main body may be formed of two lateral side panels of fabric joined on either side of a central main fabric panel.

The shape of the airbag when inflated, is preferably such that the passenger contact region comprises two shoulder portions, one on each side of a head portion, and the shoulder portions extend further than the head portion toward the passenger relative to the retainer.

In one embodiment the airbag has a shape such that, when inflated, one of the shoulder portions extends further than the other shoulder portion toward the passenger relative to the retainer, to form an asymmetrical airbag.

The shape of an airbag according to the invention, when inflated is determined by the positions of attachment, the length, and the number, of the at least one internal tether.

The tether may be formed of a planar flexible material attached in a generally horizontal plane to the retainer, and in a generally vertical plane in the passenger contact region.

A first tether may be of a first length different from the length of a second tether which is different to the second length.

Preferably at least one tether is located inside the main body and connects the retainer to two vertically spaced vertically oriented sections of the passenger contact region so as to restrain inflation of at least the portion of the passenger contact region.

At least one tether located inside the main body connects the retainer to a section of the airbag so as to restrain inflation of at least a portion of the airbag in a vertical direction.

It is envisaged that different features of the various aspects of the invention, and of various embodiments described, can be combined and interchanged without departing from the scope of the invention as defined in the claims.

Embodiments of the invention can provide an airbag for a front passenger seat which is less complicated, and cheaper to manufacture, stronger, safer and more reliable for different sized passengers, and for out-of-position and side or oblique impact scenarios.

BRIEF DESCRIPTION OF THE DRAWINGS

For a better understanding of the present invention and to show how the same may be carried into effect, reference will now be made to the accompanying drawings in which:

FIGS. 4A, 4B to 7A, 7B illustrate side views and top views respectively of different embodiments of the airbag of the invention;

DETAILED DESCRIPTION OF THE DRAWINGS

Figure 1:
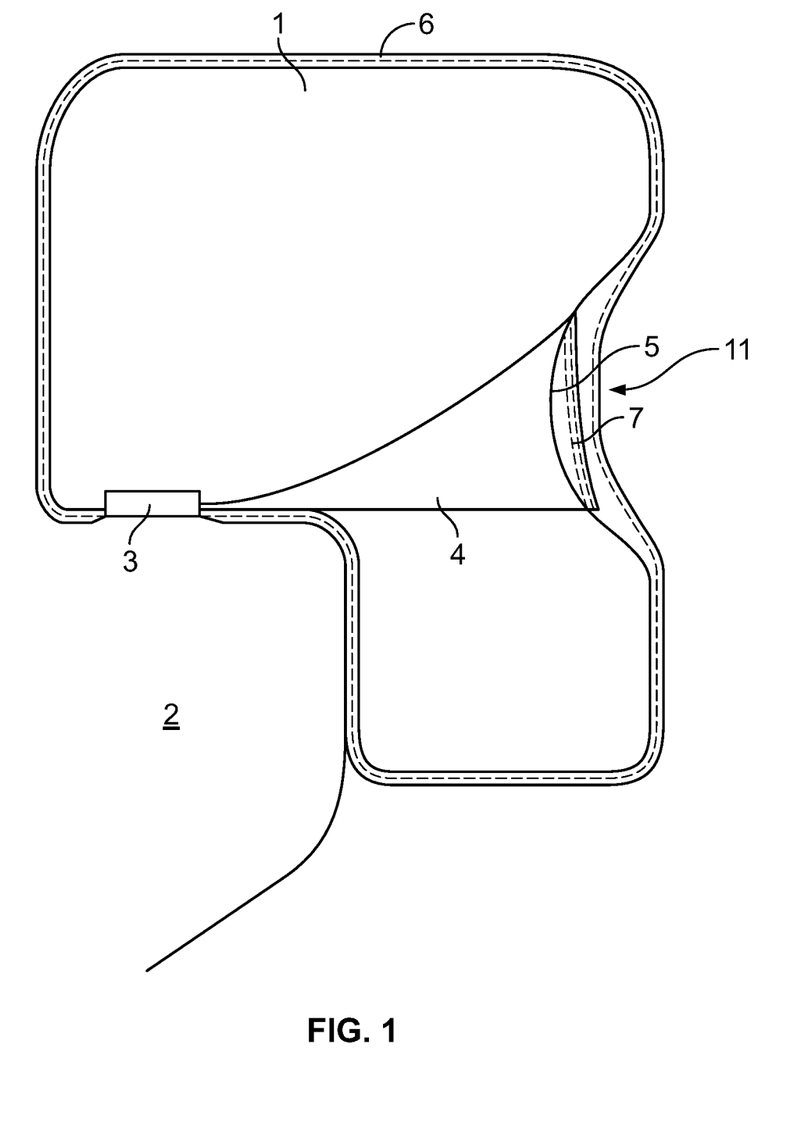
FIG. 1 is a side view cross section of an airbag according to one embodiment of the invention.

FIG. 1 shows the outline of an inflated airbag cushion 1 formed of two fabric panels stitched together around a perimeter seam 6 as shown by broken lines, and attached to a vehicle instrument panel 2 by a retainer 3. A tether 4 extends across the inside of the airbag cushion 1 and is attached at one end to the retainer 3 and at the other end by stitching 7 to an attachment region 5 of the perimeter seam 6.

The attachment region 5 may be an enhanced part, for example a wider section of the inside of the seam 6, or it may be an inner part of a pleat formed in a panel of the airbag cushion 1.

The tether 4 is a planar piece of airbag fabric and is attached to the retainer 3 in a horizontal orientation, but to the attachment region 5 in a vertical orientation, such that it turns through 90 degrees within the airbag cushion 1.

Attaching the tether to an enhanced part of the inside of the seam 6, or to the inside part of a pleat, causes the layers of fabric to be drawn closed, which resists inflation gas escaping through the stitch holes in the perimeter seam 6.

Figure 2:
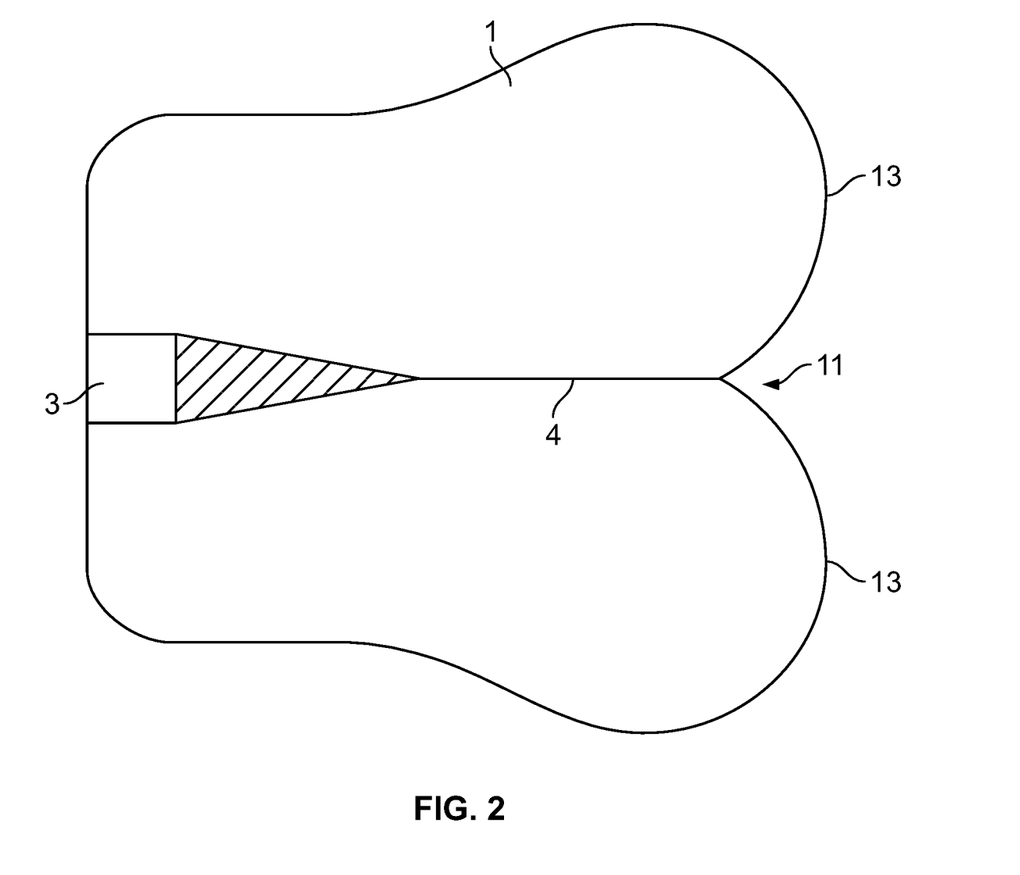
FIG. 2 is a top view cross section of the airbag of FIG. 1.

Attaching the tether in this manner forms a retracted section 11 of the airbag cushion 1, where the seam 6 is retracted inwardly toward the retainer 3, along a generally vertical line of the attachment region 5. Hence, in top view, the cushion presents two side bulges 13 on either side of the retracted section 11, as illustrated in FIG. 2. This unique shape serves to guide a crash victim's head into the retracted section 11 and protects the head laterally as well as frontally, thus improving the performance of the airbag. This also allows the airbag cushion to perform satisfactorily in an out-of-position situation, i.e. when the passenger is not sitting straight and centrally in the seat, and provides lateral as well as frontal protection in the event of oblique or side impact collisions.

Since the tether is sewn vertically and to an enhanced region 5 of the seam 6, i.e. an extended selvage or a pleat, the force is distributed along a line and no outward pressure is exerted on the perimeter seam 6 itself, so gas does not escape through the perimeter stitch holes, and also the seam does not experience as much wear as in known systems where the tethers are attached in the stitch line of the seam.

The form, position and length of the tether 4, as well as the number of tethers, can be used to create many different shapes of airbag cushion relatively easily without changing the shape of the panels of the airbag for manufacturing purposes. Thus, airbags for different vehicles and different seating positions can be manufactured from the same panels and this provides flexibility and reduces costs. In addition, unusual and asymmetrical airbag cushion shapes can be created relatively easily and cost effectively by appropriate choice of position, length and number of tethers. For example, both frontal and side impact protection can be provided from a single airbag cushion.

Figure 3:
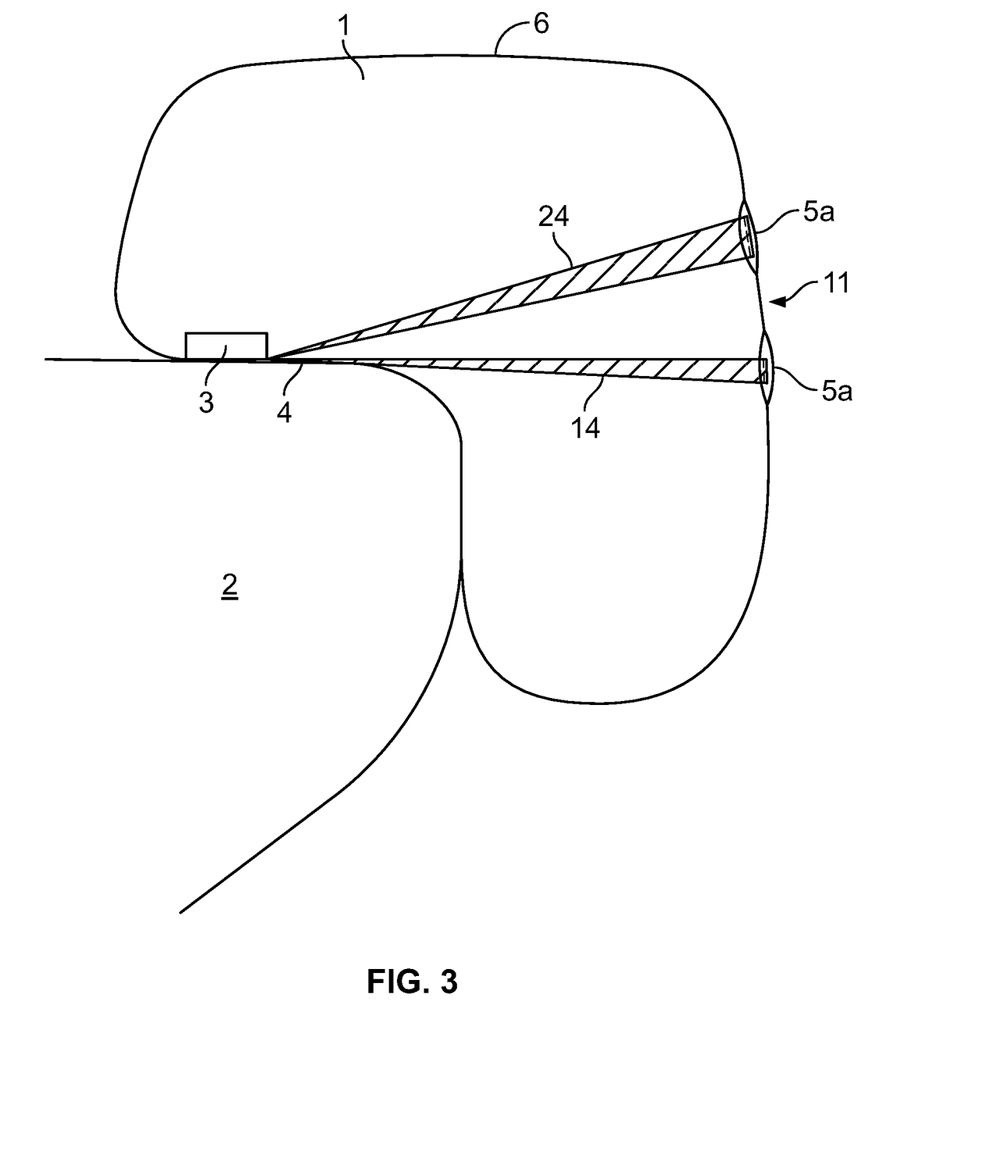
FIG. 3 is a side view cross section of an airbag according to an alternative embodiment of the invention.

Some examples are illustrated in FIGS. 3 to 7. FIG. 3 shows a tether which is partially split lengthwise to create two vertical tether parts 4a and 4b which are sewn to respective attachment regions 5, for example the selvages of two spaced apart parts of perimeter seam 6, to create a passenger facing indentation 11, as shown in top view in FIG. 2.

Figure 4A:
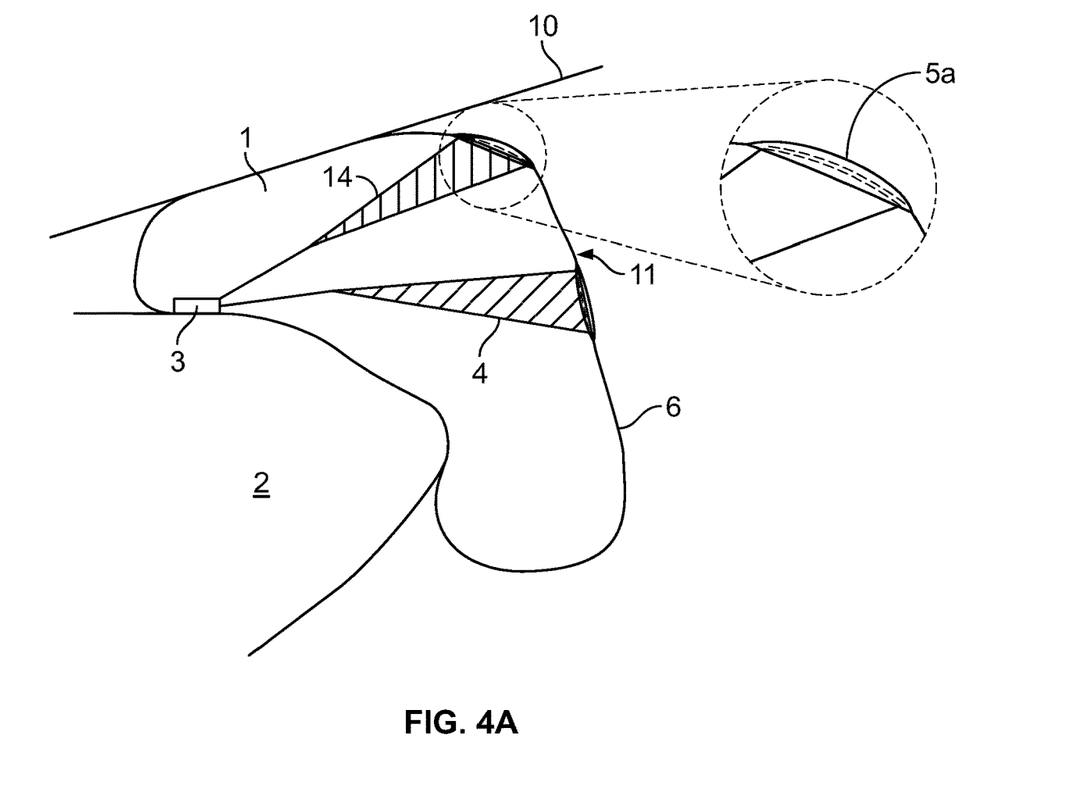
Figure 4B:
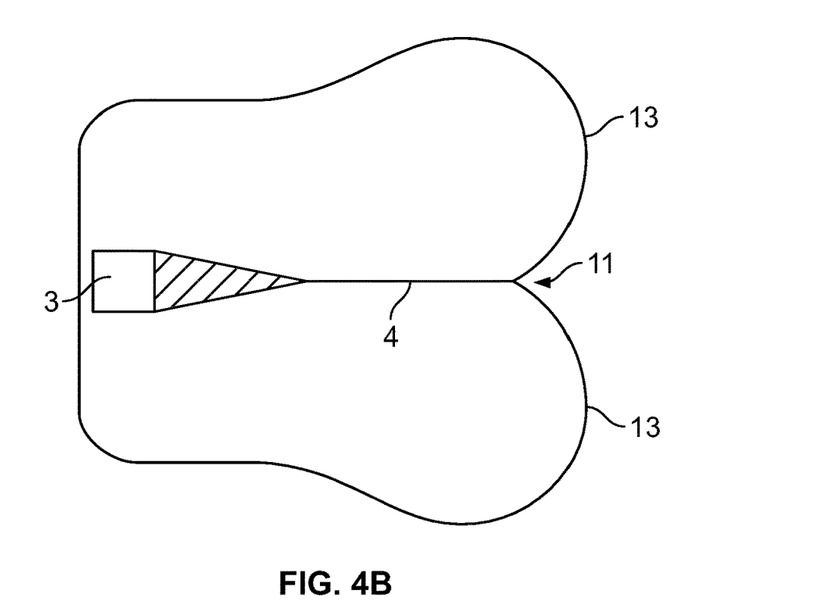

FIGS. 4A and 4B illustrate, in side view and top view respectively, a configuration suitable for a car such as a sports car, which has a relatively flat windscreen 10 which restricts the vertical space available for the inflated airbag cushion 1. In this example, in addition to the tether 4 described above, a second tether 14 is attached between the retainer 3 and the perimeter seam 6 of the airbag cushion 1 by stitching at an attachment region 5a vertically above the indentation 11, to restrain the vertical extent of the inflating airbag cushion 1 which would otherwise hit the windscreen 10 and could cause it to shatter dangerously. The attachment region 5a is shown in close up in the enlargement illustrated. FIG. 4B shows this configuration in top view.

Figure 5A:
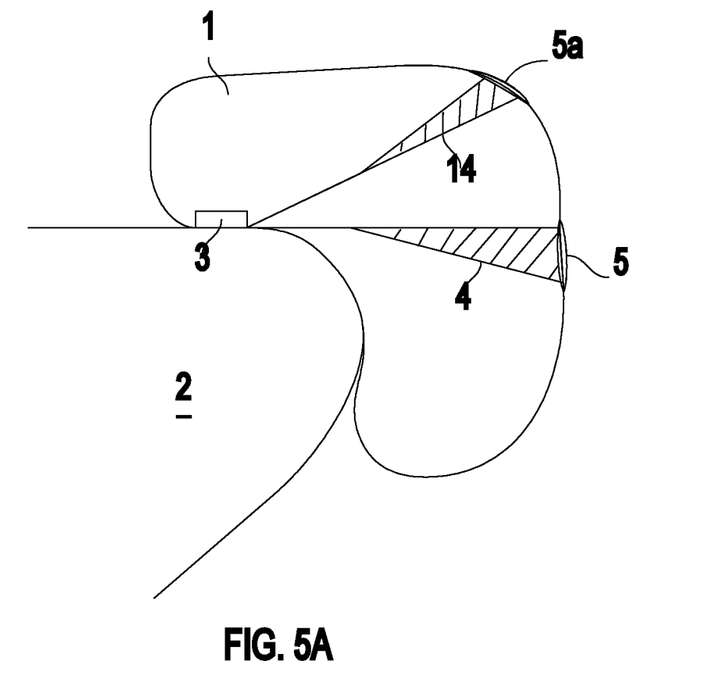
Figure 5B:
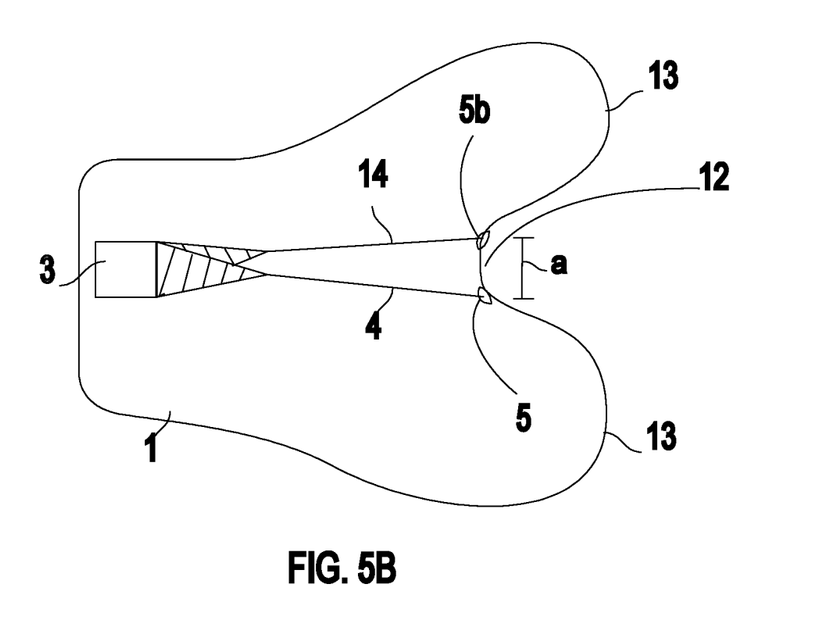
Figure 6A:
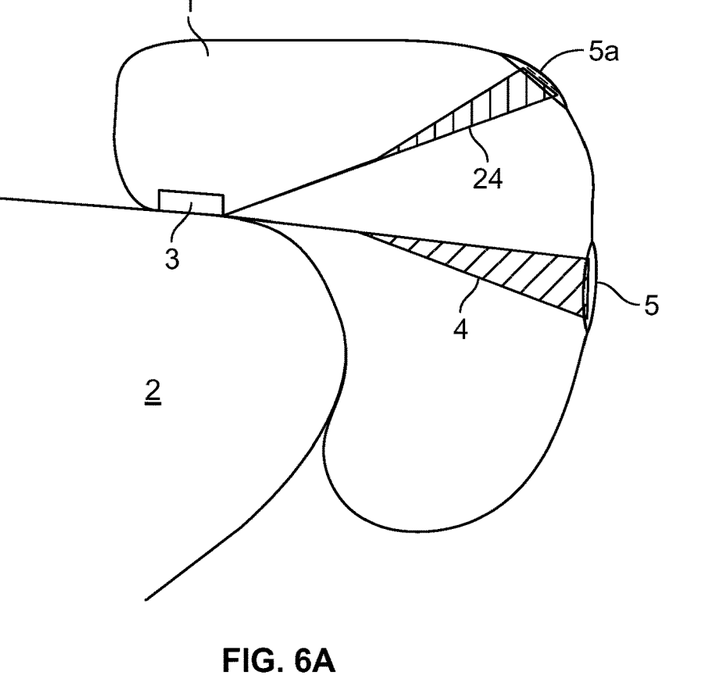
Figure 6B:
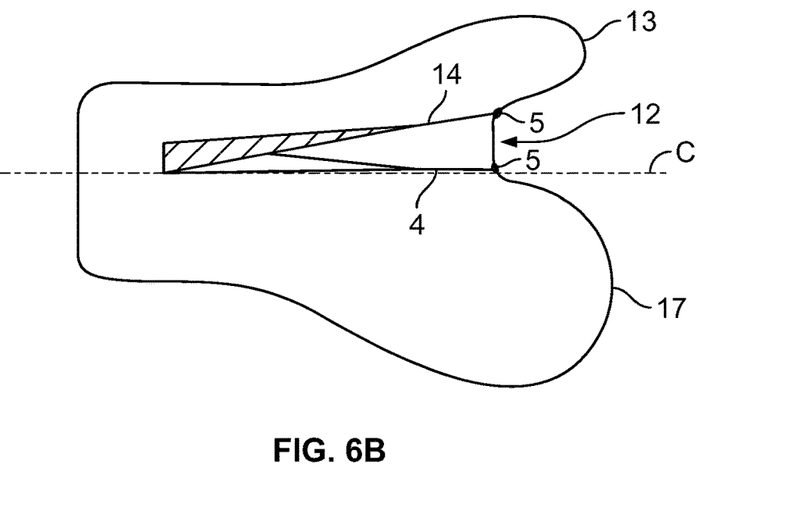
Figure 7A:
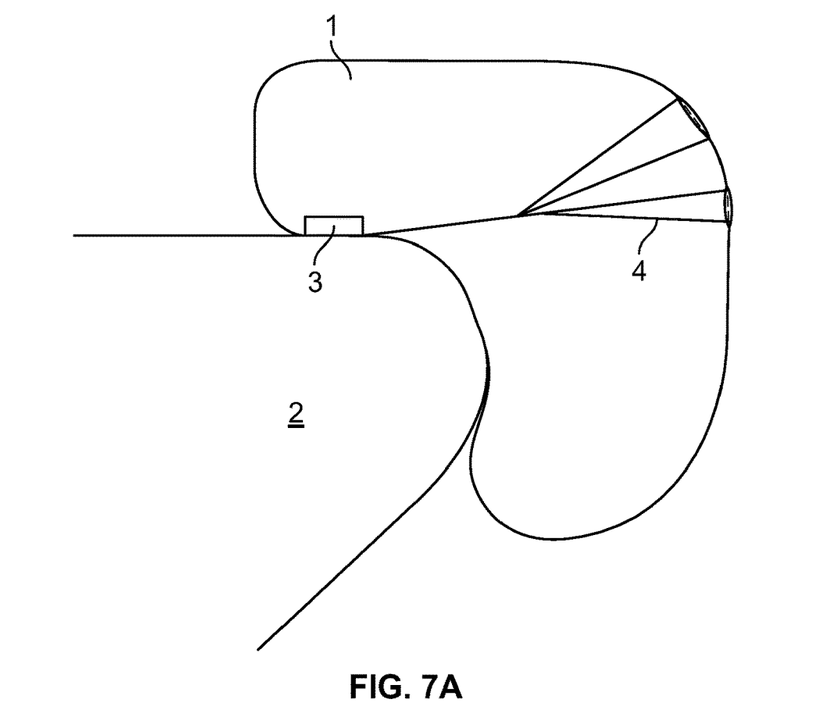
Figure 7B:
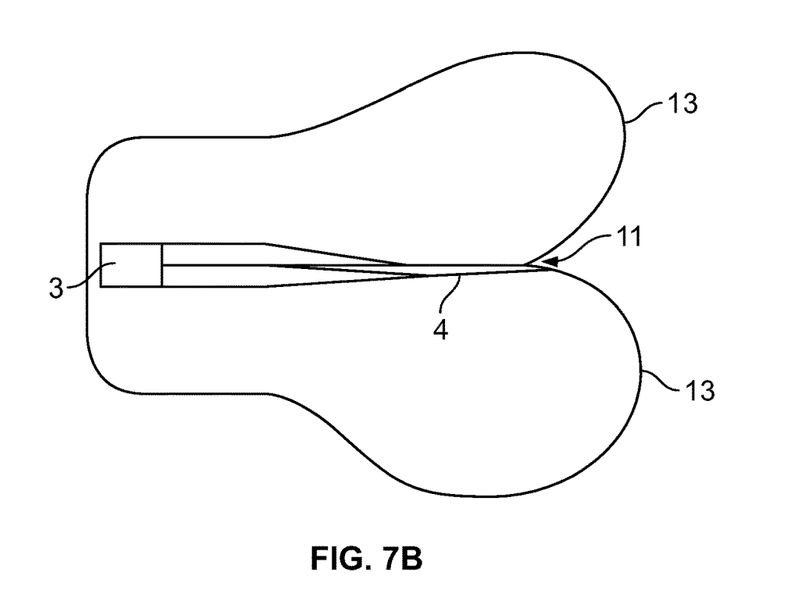

FIGS. 5 to 7 show other examples of shapes that can be created using tethers. FIGS. 5A and 5Bb illustrate, again in side and top view respectively, an airbag cushion 1 with the passenger facing indentation formed as a face panel 12 laterally expanded to a width a. This is created by attaching two parts of a tether 4, or two tethers 4 and 14, vertically at laterally spaced attachment portions 5 and 5a.

FIGS. 6A and 6B show how an asymmetrical airbag cushion shape can be created by attaching one tether 4 to an attachment region 5 which lies generally along a center line C of the airbag cushion 1, and the other tether 14 to an attachment region 15 spaced horizontally from the region 5. Thus the face panel 12 provides frontal protection for a passenger's face, and the large left side lateral bulge 17 provides lateral protection for the left side of a passenger's head so as to prevent it contacting a side panel or side window of the vehicle. A smaller right hand side lateral bulge 13 provides protection for the right hand side of a passenger's head.

FIGS. 7A and 7B illustrate the use of one split tether 4 which is attached to attachment regions 5 and 5a vertically spaced from one another.

Figure 8:
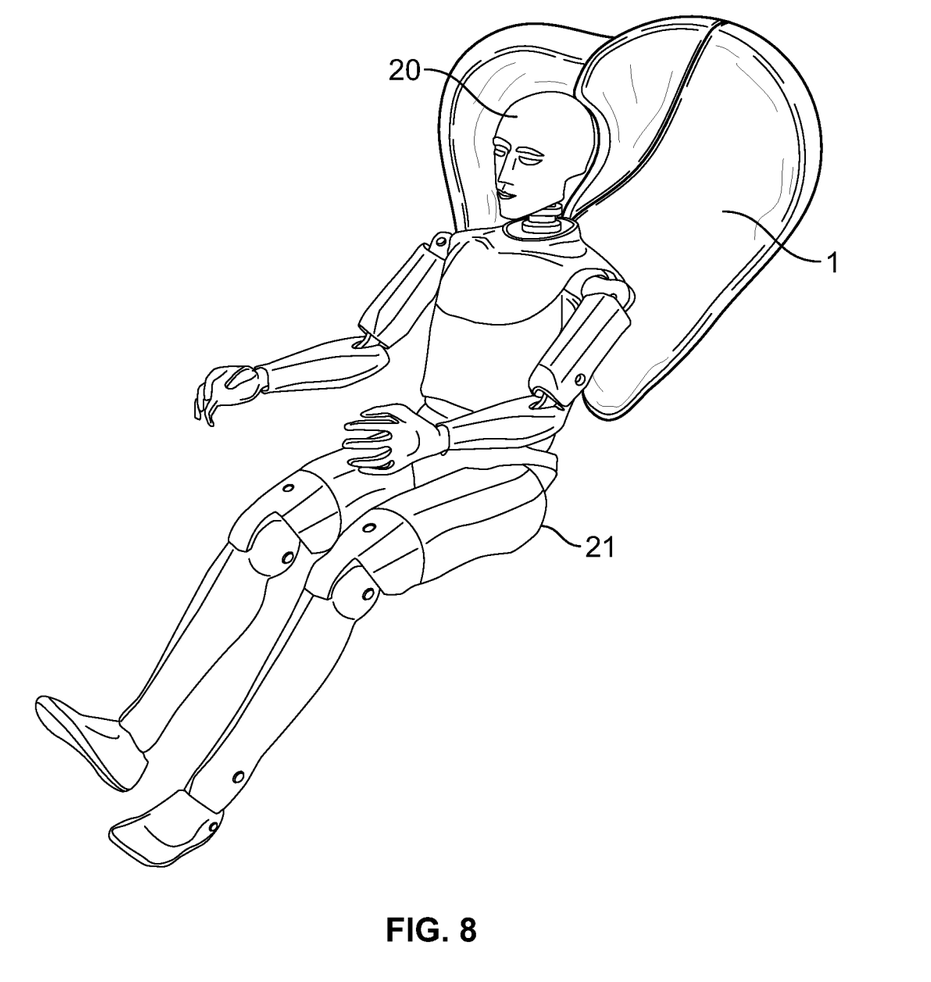
FIG. 8 illustrates an airbag embodying the invention being deployed in a crash dummy test.

The manner in which the airbag cushion 1 protects a passenger in the event of a crash is illustrated in FIG. 8 where the head 20 of a test crash dummy 21 is shown safely cushioned by the inflated airbag 1, and positioned accurately in the middle of the airbag along the retracted seam, so that the airbag bulges around the sides of the head 20 providing lateral protection and keeping the crash dummy's neck straight.

Figure 9A:
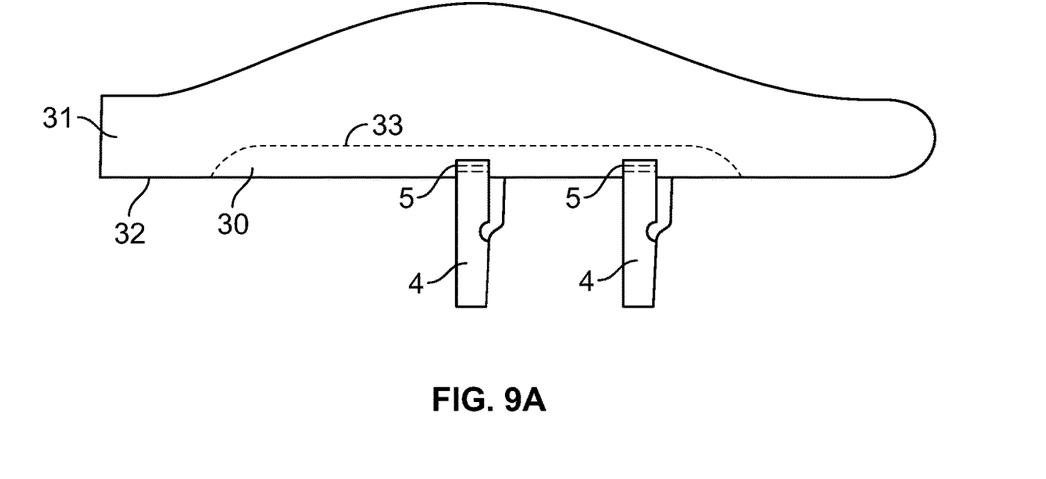
FIGS. 9A and 9B illustrate a panel of an airbag exemplifying one embodiment of the invention.
Figure 9B:
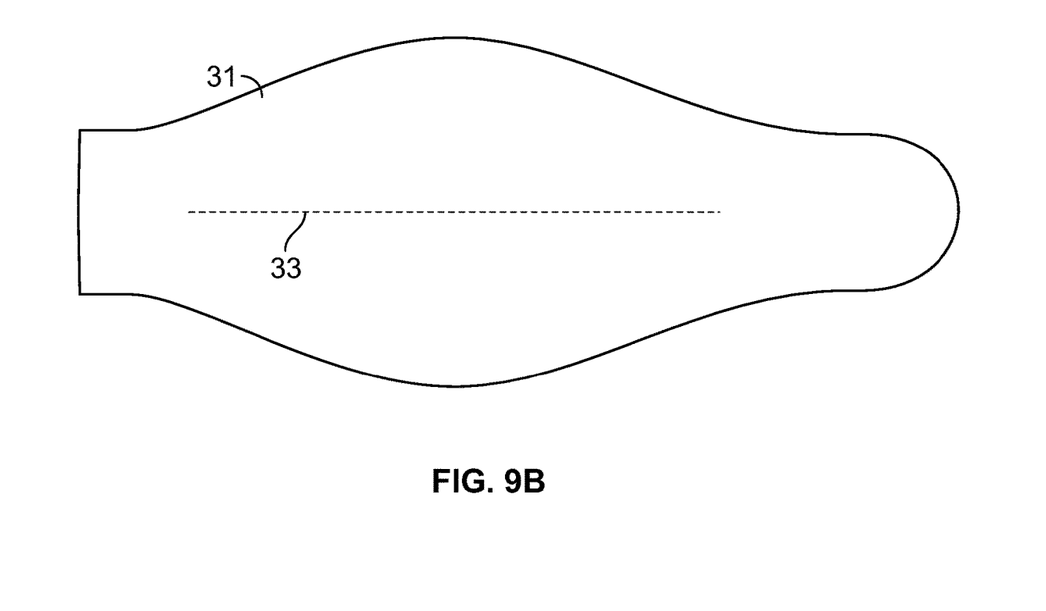

FIGS. 9A and 9B illustrate an alternative form of the attachment region 5, in which an artificial perimeter seam is created by forming a pleat 30 in a fabric panel 31 of an airbag cushion. The panel is folded along a line 32 and stitched along a line 33 to form the pleat, or artificial seam 30. One or more tethers 4 are then sewn vertically to this artificial seam 30 as illustrated in FIG. 9A. Each tether 4 is split lengthwise at one end and each part is sewn on an opposing side of the pleat 30 along stitch lines which are located inside the stitch line of the pleat itself so that the stitches are within the airbag itself.

Figure 10:
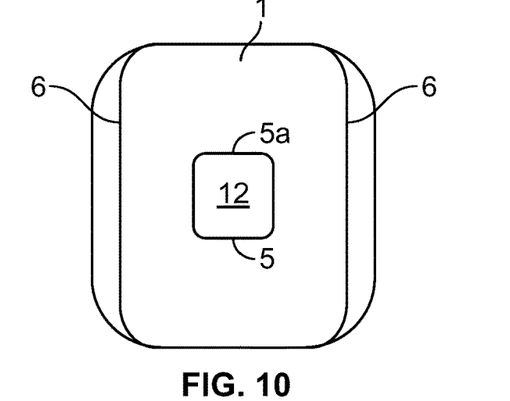
FIGS. 10, 11, 12 and 14 illustrate alternative shapes of airbags according to different embodiments of the invention.
Figure 11:
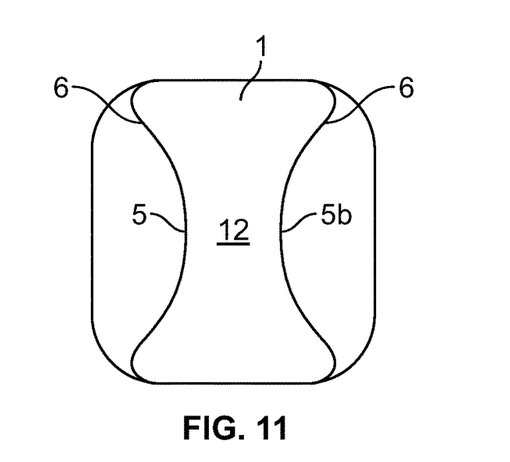
Figure 12:
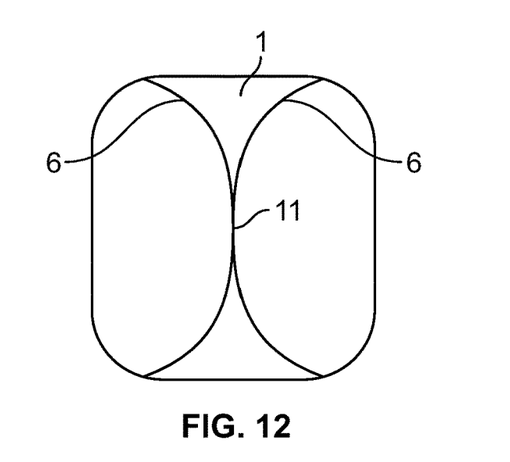

FIGS. 10, 11 and 12 show views from the front, of different configurations of an airbag. In FIG. 10 a face panel 12 is formed by horizontal tethers attached at vertically spaced attachment regions 5 and 5a so that the front face of the airbag is pulled at the two points 5 and 5a in the unfolding direction.

FIG. 11 shows perimeter seams 6 located towards the middle of the airbag cushion 1 and vertical tethers 4 attached at lines 5 and 5b so that the fabric is pulled at two lines in the unfolding direction.

FIG. 12 shows the perimeter seams meeting in the middle of the front face of the airbag cushion 1 along the line 11 where the tether 4 is sewn vertically causing the indentation 11 along the line 4. This shape can be achieved either by sewing the tether 4 to the selvage of a perimeter seam or by using a panel with a fold or pleat in the middle so that it extends across the whole width of the airbag from one side to the opposite side.

Figure 13:
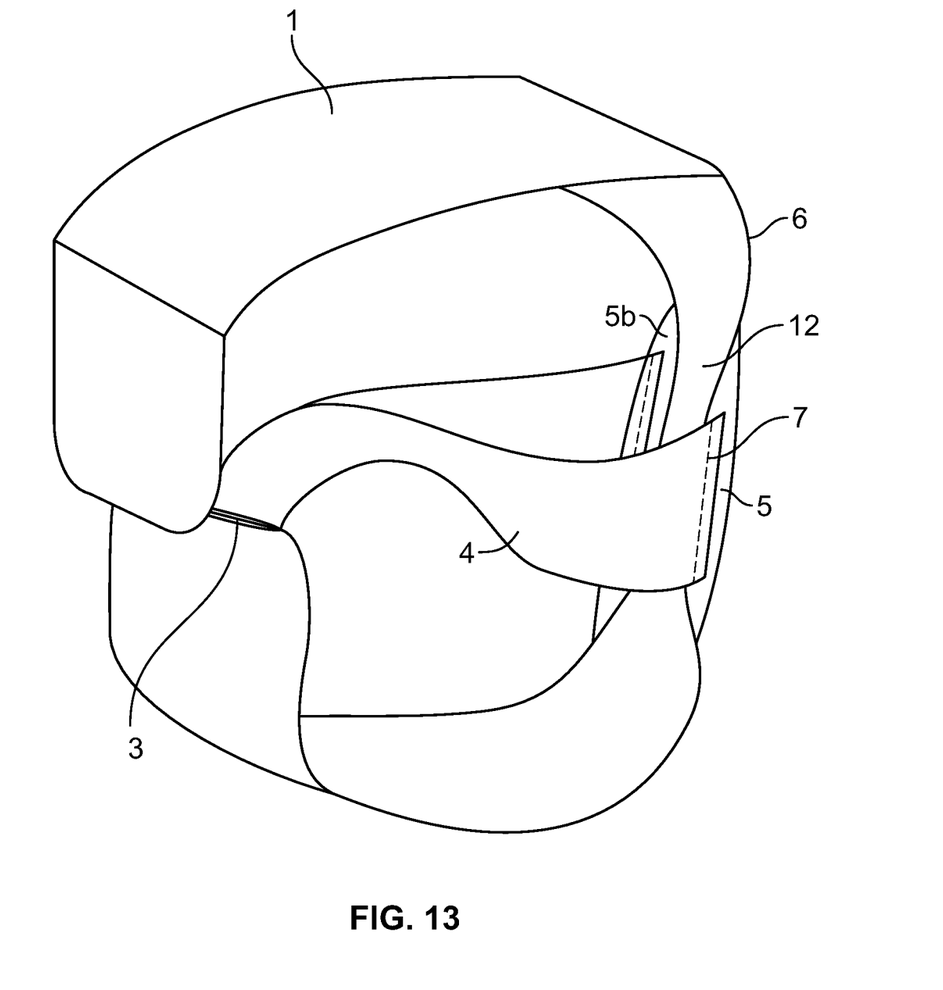
FIG. 13 is a three-dimensional cut-away perspective view of the airbag of FIG. 11.

FIG. 13 is a three-dimensional representation of the configuration of FIG. 11, in which the perimeter seams 6 converge toward the middle of the airbag cushion 1 at the face panel 12, and the tether 4 is stitched vertically (shown by the broken lines) to enhanced seam sections forming the attachment regions 5 and 5b of the perimeter seams 6 which are laterally spaced apart on either side of the face panel 12.

Figure 14:
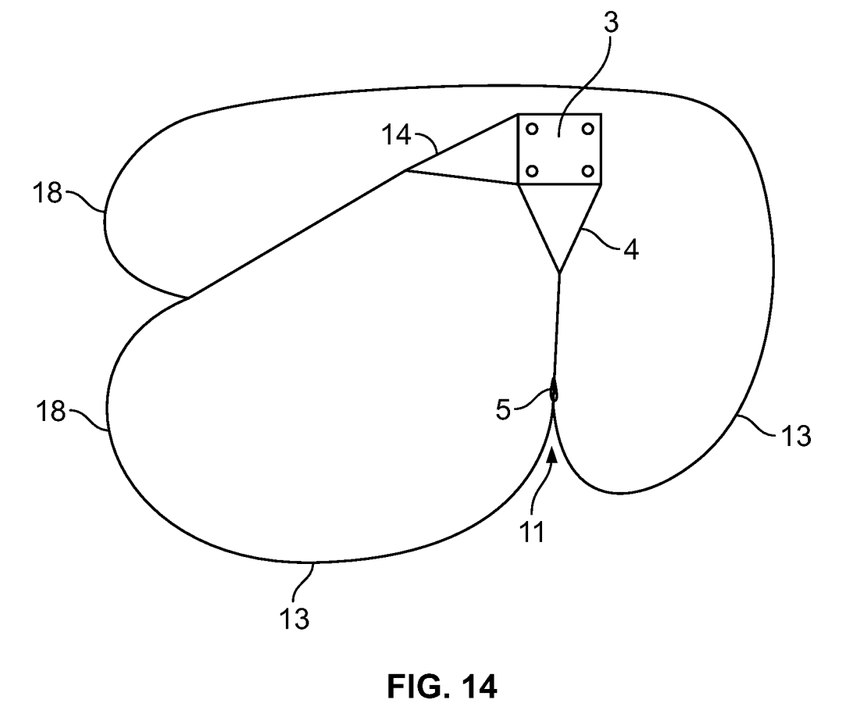

FIG. 14 is a cross section of another embodiment using two tethers 4 and 14 to create bulges 13 facing generally toward the passenger and two side facing bulges 18. This is particularly applicable to asymmetrical load situations.

The invention claimed is:

1. An airbag for a front passenger seat, comprising:
   an inlet port for inflation gas;
   a main body, formed of at least one panel of fabric, and comprising a retainer adapted for mounting the airbag to a vehicle, and a passenger contact region; and
   at least one tether located inside the main body and connecting the retainer to the passenger contact region so as to restrain inflation of at least a portion of the passenger contact region,
   wherein the tether is attached to the fabric panel along a generally vertical line by stitches which pass through stitch holes which are located inside the main body,
   wherein the tether is formed of a planar flexible material attached in a generally horizontal plane to the retainer, and in a generally vertical plane in the passenger contact region so that the tether turns 90 degrees within the airbag as the tether extends between the retainer and the passenger contact region,
   wherein the tether is attached to the passenger contact region by stitching to a part of a single panel of the at least one panel of fabric which part is inside the main body, and
   wherein the part comprises an internal pleat formed by folding and stitching the single panel of the at least one panel of fabric, wherein the internal pleat and the passenger contact region are formed from the single panel of the at least one panel of fabric.

2. An airbag according to claim 1 wherein the at least one tether comprises a longitudinally folded length of fabric having one end divided longitudinally, and wherein one of the divided ends is stitched in contact with one fold of the pleat and the other of the divided ends is stitched in contact with the opposite fold of the pleat.

3. An airbag for a front passenger seat, comprising:
   an inlet port for inflation gas;
   a main body, formed of at least one panel of fabric, and comprising a retainer adapted for mounting the airbag to a vehicle, and a passenger contact region; the airbag further comprising:
   a first tether of a first length and a second tether of a second length, wherein the first length is different than the second length, wherein the first tether and the second tether are located inside the main body and connect the retainer to two horizontally spaced and vertically oriented sections of the passenger contact region, so as to restrain inflation along two vertical lines of at least a portion of the passenger contact region, wherein the first tether and the second tether are formed of a planar flexible material attached in a generally horizontal plane to the retainer, and in a generally vertical plane in the two horizontally spaced and vertically oriented sections of the passenger contact region so that the tether turns 90 degrees within the airbag as the tether extends between the retainer and the two horizontally spaced and vertically oriented sections of the passenger contact region, wherein the first tether and second tether are attached to the two horizontally spaced and vertically oriented sections of the passenger contact region by stitching to a part of a single panel of the at least one panel of fabric which part is inside the main body, and wherein the part comprises an internal pleat formed by folding and stitching the single panel of the at least one panel of fabric, wherein the internal pleat and the two horizontally spaced and vertically oriented sections of the passenger contact region are formed from the single panel of the at least one panel of fabric.

4. An airbag according to claim 1 wherein the main body is formed of two lateral side panels of fabric joined on either side of a central main fabric panel.

5. An airbag according to claim 1 which has a shape such that, when the airbag is inflated, the passenger contact region comprises two shoulder portions, one on each side of a head portion, and the shoulder portions extend further than the head portion toward the passenger relative to the retainer, one of the shoulder portions extends further than the other shoulder portion toward the passenger relative to the retainer, to form an asymmetrical airbag.

6. An airbag according to claim 1 comprising a first tether of a first length and a second tether of a second length, and wherein the first length is different to the second length.

7. An airbag according to claim 1 comprising at least one tether located inside the main body and connecting the retainer to two vertically spaced vertically oriented sections of the passenger contact region so as to restrain inflation of at least the portion of the passenger contact region.

8. An airbag according to claim 1 comprising at least one tether located inside the main body and connecting the retainer to a section of the airbag so as to restrain inflation of at least a portion of the airbag in a vertical direction.

9. An airbag according to claim 3 which has a shape such that, when the airbag is inflated, the passenger contact region comprises two shoulder portions, one on each side of a head portion, and the shoulder portions extend further than the head portion toward the passenger relative to the retainer.

10. An airbag according to claim 3 wherein the tether is formed of a planar flexible material attached in a generally horizontal plane to the retainer, and in a generally vertical plane in the passenger contact region.

11. An airbag according to claim 3 comprising at least one tether located inside the main body and connecting the retainer to a section of the airbag so as to restrain inflation of at least a portion of the airbag in a vertical direction.

* * * * *